Figure 1:
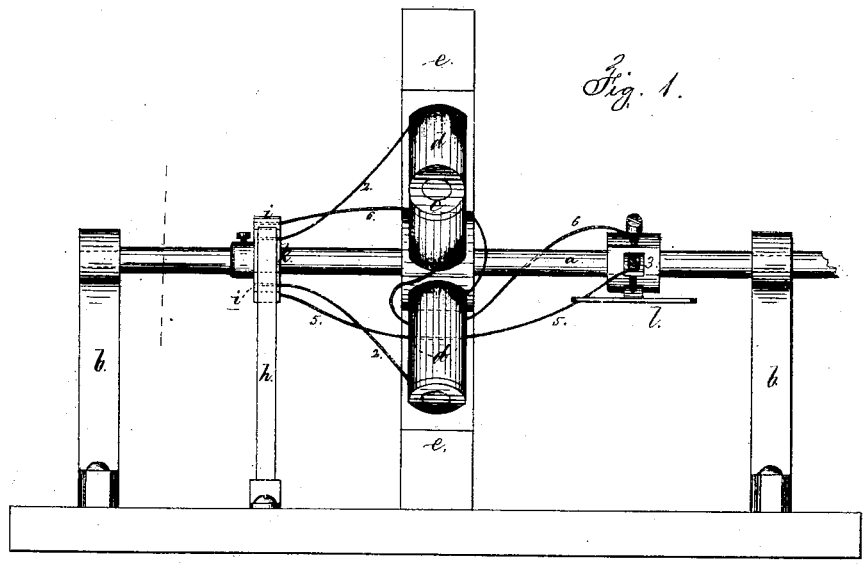

*Thomas A. Edison.*
*Impt. in Electro Motor Governors.*

111112            PATENTED JAN 24 1871

Witnesses,
Chas. H. Smith
Geo. T. Pinckney

Thomas A. Edison.
Lemuel W. Serrell
Atty.

United States Patent Office.

THOMAS A. EDISON, OF NEWARK, NEW JERSEY, ASSIGNOR TO HIMSELF, ELISHA W. ANDREWS, GEORGE B. FIELD, AND MARSHALL LEFFERTS, OF NEW YORK, N. Y.

IMPROVEMENT IN GOVERNORS FOR ELECTRO-MOTORS.

Specification forming part of Letters Patent No. 111,112, dated January 24, 1871.

*To all whom it may concern:*

Be it known that I, THOMAS A. EDISON, of Newark, in the county of Essex and State of New Jersey, have invented an Improvement in Electro-Motor Governors, and the following is declared to be a correct description thereof.

Electro motors have heretofore been made by revolving armatures and stationary electro-magnets, and also by revolving electro-magnets and stationary armatures.

My invention is designed for regulating the speed of a revolving electro-magnetic motor by breaking the circuit through one or more of the magnets in case the speed increases beyond the set limit, so as to lessen the power of rotation.

This is effected by a spring or yielding rotary fly acting against the air, but keeping the circuit through it closed, except when the speed of rotation is such that the resistance of the atmosphere causes the arm of the fly to move and break the electrical circuit; so that one or more of the revolving magnets are not charged until the speed lessens sufficiently to allow the fan to close the circuit.

In the drawing—

Figure 2:
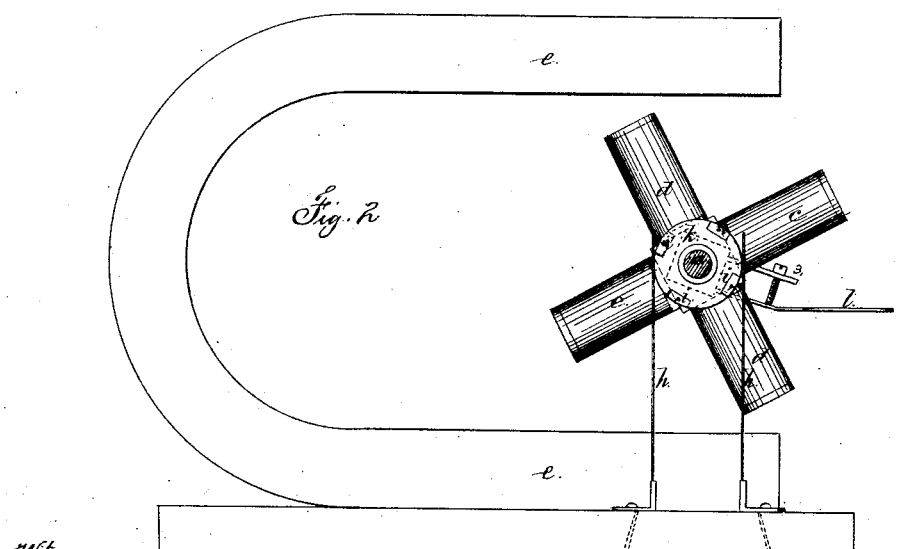

Figure 1 is an elevation endwise of the revolving shaft that carries the electro-magnets; and Figure 2 is a side view of the said shaft and parts connected therewith.

The shaft $a$ is mounted to revolve in suitable bearings, $b\ b$, and carries a series of electro-magnets, $c\ c\ d\ d$. I have shown two pairs of such magnets, but the number may be increased.

The stationary permanent magnet $e$ is shown, within which the magnets $c\ c\ d\ d$ revolve, and said permanent magnet $e$, by the attraction and repulsion of the respective poles of the electro-magnets, produces the rotation of the shaft $a$ and magnets $c\ c\ d\ d$, as heretofore well known.

I here remark that stationary armatures might take the place of the magnet $e$, and that the circuits of the magnets $c\ c\ d\ d$ are opened and closed by the revolution of the shaft $a$.

The insulated blocks $i\ i$, in the hub $k$, are connected by wires with the coils in the respective magnets $c\ c\ d\ d$, and the springs $h\ h$, that impinge upon the periphery of the hub $k$, are connected with a proper battery, either directly or by wires passing through other machinery, or to a distant station.

The blocks $i$ are connected in pairs, two on opposite sides, having wires 2 2 leading to the electro-magnets $d\ d$, the helices of which magnets $d\ d$ are connected.

The other pair of blocks $i\ i$ are connected, the wire 5 passing to the insulated adjusting-screw 3, and yielding fan $l$, thence by the wire 6 to the magnets $c\ c$, and through them to the other or opposite block $i$, upon the hub $k$.

It will now be understood that the screw 3 can be adjusted so that when the revolving shaft $a$ reaches its maximum speed, the circuit through the wires 5 and 6, screw 3, and fan $l$, will be broken, and the power of the motor be lessened by the magnets $c\ c$ ceasing to act, and so soon as the speed of the motor is lessened, the yielding fly again closes the circuit.

By means of the alternate closing and breaking of the circuit according to the speed, a nearly uniform velocity of the motor is insured; hence two or more instruments can be propelled at almost the same speed, even at distant stations, the regulation of the speed being by the screw 3.

I claim as my invention—

A yielding fly rotating against the atmospheric resistance, and so arranged as to break or close an electrical circuit, in combination with a revolving electro-magnetic motor, substantially as and for the purposes set forth.

Signed by me this 29th day of June, A. D. 1870.

THOMAS A. EDISON.

Witnesses:
 CHAS. H. SMITH,
 GEO. T. PINCKNEY.